April 18, 1950 J. G. BEARD 2,504,294

MOTOR REVERSING SYSTEM

Original Filed Jan. 25, 1945 2 Sheets-Sheet 1

INVENTOR
JOSEPH G. BEARD
BY Harry Tanick
ATTORNEY

INVENTOR
JOSEPH G. BEARD
BY Larry Tunick
ATTORNEY

Patented Apr. 18, 1950

2,504,294

UNITED STATES PATENT OFFICE 2,504,294

MOTOR REVERSING SYSTEM

Joseph G. Beard, Haddonfield, N. J., assignor to Radio Corporation of America, a corporation of Delaware Original application January 25, 1945, Serial No. 574,454. Divided and this application March 6, 1948, Serial No. 13,499

1 Claim. (Cl. 318—283)

In my parent application, Serial #574,454, filed January 25, 1945, I disclose a new and improved method of and means for maintaining the frequency of an oscillation generator substantially constant. This application is a division of said parent application.

In said parent application, the master oscillator has an automatic frequency control system therefor wherein two discriminator circuits, one of which has a sharp frequency versus voltage characteristic and the other of which has a broad frequency versus voltage characteristic, are provided. These discriminators each include detectors which supply control potentials, used together to retune the master oscillator to correct its mean frequency. The discriminator with the sharp or narrow frequency versus voltage characteristic under usual conditions maintains the oscillator within a very narrow range of frequencies. If, for some reason, the oscillator has become deviated from its assigned mean frequency a considerable amount, then the discriminator with the broad frequency versus voltage characteristic will bring the oscillation generator back within the range covered by the discriminator having the sharp frequency versus voltage characteristic, at which point the latter mentioned discriminator takes over and again holds the oscillation generator within narrow limits during usual operation.

As stated above, both discriminators supply potentials for automatic frequency control potentials and an object of my invention is improved use of these control potentials for the purpose intended. This object is attained by providing a bridge circuit at least one branch or arm of which includes a tube impedance which is controlled by the combined potentials from the discriminators. The bridge is unbalanced in a sense or direction depending on the direction of deviation of the master oscillator from its assigned frequency and this unbalance sets up currents or potentials used to retune the master oscillator.

A further object of the invention is a circuit actuated by the discriminator detector potentials which will operate properly in the presence of direct current voltage changes and during the time the tube in the bridge described above is warming up. In a preferred embodiment, I provide a bridge wherein the two arms each include a tube output impedance which impedances vary in the presence of direct current voltage changes and during the warm-up period in like manner so that the bridge is always balanced and symmetrical in operation.

Figure 1:
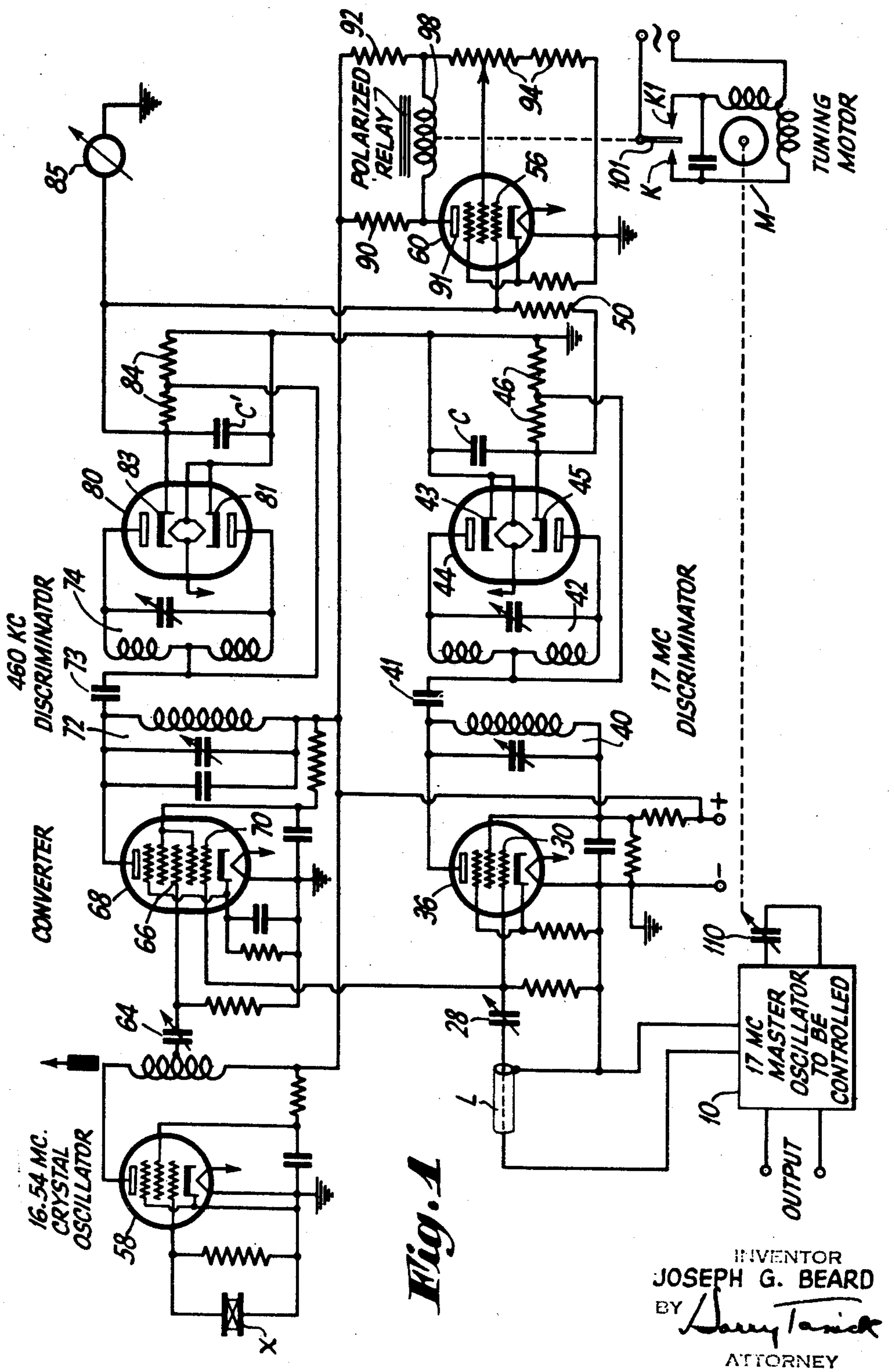
Figure 2:
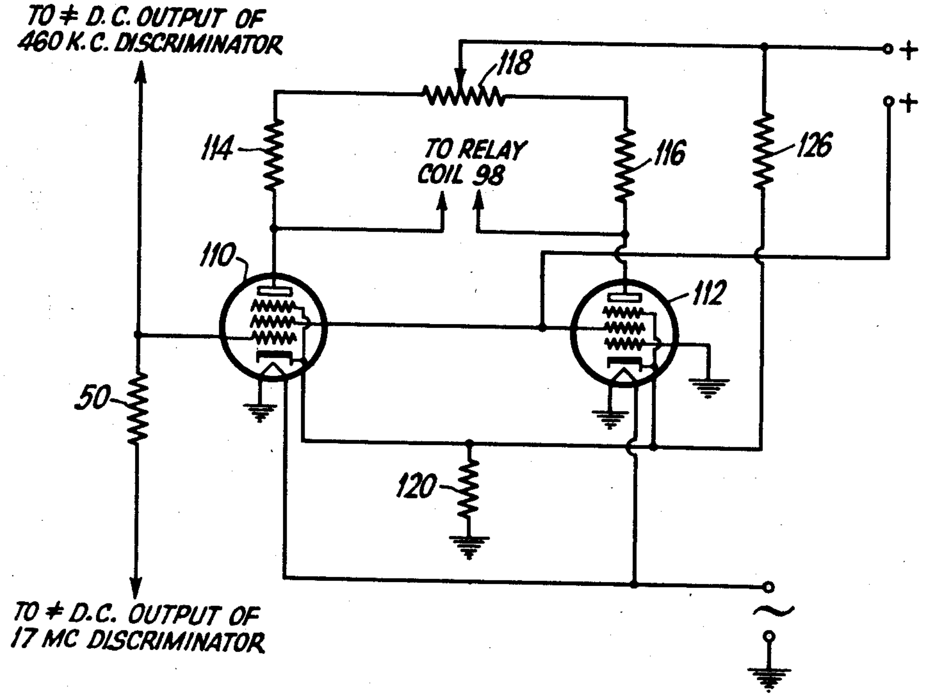

In describing my invention in detail reference will be made to the attached drawings wherein Fig. 1 illustrates details of my improved bridge circuit and the essential circuit elements of a frequency stabilizing system wherein the control potential for the bridge is developed; while Fig. 2 illustrates a modification of the bridge circuit of Fig. 1.

In the embodiment illustrated in Fig. 1, the master oscillator in 10 feeds output through a line L and condenser 28 to the control grid 30 of a coupling and limiting and amplifying tube 36, the anode of which feeds into a tuned circuit 40, the inductance of which provides the primary winding of a transformer, the secondary winding of which is in a tuned circuit 42 coupled somewhat as disclosed in Seeley Patent #2,121,103 to a diode detector system 44. The tuned circuit 40 is also coupled more directly by condenser 41 to a point on the inductance of circuit 42 and thence to the anodes of the detectors in tube 44. The cathodes of the diodes are coupled by impedances 46 shunted by radio frequency bypass condenser C. The cathode 43 end of the resistances 46 is grounded, while the cathode 45 end of the resistances 46 is connected to the grid 56 of a tube 60. The discriminator operates in a well known manner to produce across the output impedances 46 and on resistance 50 direct current potentials which change above and below zero or ground potential as the frequency of the master oscillator in 10 swings with respect to its assigned frequency to which the discriminator circuits 40 and 42 are tuned.

As stated above, one end of the impedances 46 is grounded while the other end thereof is connected by resistance 50 to the control grid 56 of a relay tube 60 connected in the bridge circuit mentioned above.

The reference frequency source including the crystal X in the grid circuit of a tube 58 the anode circuit of which includes an iron core inductance supplies oscillatory energy through coupling condenser 64 to the third grid 66 of a converter and limiting tube 68. This tube has its first grid 70 coupled by condenser 28 and line L to the master oscillator in 10. The crystal oscillator is of the type wherein the crystal is between the grid and cathode and the anode is tuned to a frequency above the crystal frequency. Such oscillators are well known in the art and a detailed description will not be given here. The lower side band is selected in the discriminator circuit 72, 73, and 74, connected with the anode of tube 68. This discriminator circuit is similar to the discriminator circuit described hereinbefore, and with the double detector 80 supplies across the impedances 84 potentials which vary with respect to about zero potential when the frequency of the master oscillator varies because these variations appear in the lower side band and operate through the discriminator and detector circuit 72, 73, 74 and 80, to produce the said potentials. Here the cathode 81 end of the resistances 84 is connected to ground and the cathode 83 end of these resistances is connected to the grid 56 of the relay tube 60.

The anode 91 of this tube 60 is in the bridge circuit mentioned above. This bridge circuit includes resistances 90, 92 and 94, a tap on which is connected to the screen grid in tube 60. A relay winding 98 is connected between the anode 91 of tube 60 and one terminal of resistance 92. A source of direct current potential is connected to the other end of resistance 92 and to the end of resistance 90 remote from the anode 91 of tube 60. The adjustment and element and source value is such that with zero potential on the grid 56 the current through tube 60 just balances the current through the resistances 92 and 94 which also shunt the direct current source. Under these circumstances the polarized relay winding 98 has both ends at the same direct current potential and no current flows therein. This holds the armature 101 in a neutral or central position. The armature 101 cooperates with two contacts K and K1 to close an alternating current circuit through one or the other windings of a motor M. The motor shaft is operated to drive a tuning reactance shown as a tuning condenser 110.

Now when the discriminators operate as described above, a potential is set up on the grid 56 which is about zero when the oscillator in 10 is operating at the proper frequency. If the oscillator frequency increases the potential on the grid 56 becomes say positive, and more current flows through the tube 60. This upsets the balance across winding 98 and the armature is moved in a direction to close an alternating current circuit through one of the motor windings to rotate the condenser 110. The contact closing action and the discriminator action are so related that the motor now tunes the condenser 110 in a direction to decrease the frequency of the oscillator in 10 and bring it back to its normal frequency. When the frequency of the oscillator 10 decreases a negative potential is produced on the grid 56 and this operates through the bridge circuit to raise the frequency of the oscillator. It will be understood that the discriminators may be arranged to produce negative potential when the frequency of 10 increases, and positive potential when the frequency of 10 decreases. Then the operation of the armature by the winding 98 and the arrangements of the contacts K and K1 are such as to turn the motor in the proper direction to correct the frequency change.

To put the system in operation the 460 kilocycle discriminator primary circuit 72 is tuned to produce a maximum direct current output across resistance 84, while holding the side band output of 460 kilocycles constant. A meter 85 may be added to measure this voltage. Then the secondary 74 of this discriminator is tuned for zero direct current output in this meter. The same adjustment is then applied to the 17 megacycle discriminator. The order of adjustment of the discriminators may be reversed. The discriminator outputs are then checked for polarity so that they are additive at the resistance 50 and on the grid 56. If the outputs are opposed the 460 kilocycle discriminator is tuned to the wrong side band.

Then the potentials on the electrodes of the tubes 60 are adjusted so that the current through 90 is equal to the current through 92 with zero bias on the grid 56. The tap on the resistance 94 supplying voltage to the screen grid of tube 60 assists in obtaining this balance of currents in the bridge circuit. In establishing the zero direct current potential on the grid 56 and in referring to the same hereinbefore, contact potential is disregarded.

Now when the system goes into operation the broad discriminator will tune the same when necessary into the range of the sharp discriminator and the same will take over and hold the frequency of operation within narrow limits.

The two tubes 36 and 68, in addition to acting respectively as coupling and converting tubes, also act as limiters. This improves the operation of the system materially. In the first place, variations in amplitude of the inputs to the tubes are flattened out so that the discriminators are supplied with currents of constant peak amplitude. This limiting action flattens out peaks on both sides of the center or zero of the frequency versus voltage characteristics of the discriminator circuits, thereby smoothing out the control action. The main thing is to make sure that these tubes are not overloaded, and that there is enough voltage to properly operate the tubes 44 and 80. In the circuits the usual cathode resistors shunted by condensers may be used with the usual grid leak or grid bias resistances. Limiting takes place due to the fact that the plate and screen voltage is low and this in combination with the proper bias produces limiting. The limiting circuits disclosed herein are conventional and utilize the principle disclosed on page 210 of Hund's Frequency Modulation text book published in 1942.

While applicant does not hereby intend to limit his circuit elements to particular values since obviously a wide range of circuit elements may be used, depending to a large extent upon the frequencies involved, in the embodiment tested using the frequencies discussed above, and the circuit constants listed below, the oscillator operating at 17 megacycles was to be maintained within limits of ±.1% deviation. The actual figure achieved is about ±3000 cycles or ±.01%. For the effect of temperature it was found that such changes caused a 25 cycle variation per degree centigrade at 17 megacycles, and this variation was thought small enough to be neglected in practical applications.

In oscillators used for industrial heating it is not uncommon to have a frequency deviation as great as ±10% which is readily handled by the 17 megacycle discriminator. Small deviations are handled by the 460 kilocycle discriminator.

In the embodiment tested tubes 36, 58 and 60 are type 6AG7, tube 68 is type 6SA7, tubes 44 and 80 are type 6H6. Impedance 46 comprises two 10,000 ohm resistances. Impedance 84 comprises two 100,000 ohm resistors. C is .001 $\mu$f, while C′ is .0001 $\mu$f. Resistances 94 and 92 are 3000 ohms. Resistance 90 comprises a potentiometer section of 5000 ohms and a fixed section of 11,000 ohms. The frequencies involved are given in the specification.

Where the bridge circuit is coupled by a single tube 60 into the outputs of the rectifiers 44 and 80 as in Fig. 1, a noticeable drift of the mean frequency of the master oscillator may take place during the warm-up period. This drift is due to unbalance of the bridge. The values of the balancing resistors 90, 92 and 94 do not change but the resistance of the tube 60 does change as its cathode goes up to operating temperature. An additional object of my invention is to provide a relay between the two discriminators and the motor control circuits free of this defect. I have illustrated in Fig. 2 a modified circuit coupling the discriminators to the relay which controls the motor circuit. This bridge circuit includes two electron discharge devices 110 and 112 in a balanced bridge circuit which may be said to have two symmetrical halves, both of which vary in approximately the same manner during the warming-up process because the variables therein are balanced. In this bridge circuit the cathodes of tubes 110 and 112 warm up together so that the bridge remains balanced during the warm-up period.

More in detail, this bridge circuit comprises in addition to the tubes 110 and 112, resistors 114 and 116 coupling the anodes of the respective tubes to the terminals of a potentiometer 118. A point on the potentiometer 118 is connected to the positive terminal of the direct current source. The cathodes of the tubes and the suppressor grids are connected together and to ground by a cathode biasing resistor 120. One side of the bridge includes the output impedance of tube 110 in series with resistance 120, resistance 114 and part of resistance 118 across the direct current source. The other side comprises the output impedance of tube 112, resistances 120 and 116 and part of resistance 118. If the tube output impedances are about equal, resistances 114 and 116 may be equal and small variations in tube impedances balanced by moving the tap on resistance 118. The two voltages from the two discriminators which vary about zero potential are supplied to the grid of the tube 110 while the grid of the tube 112 is at ground or zero potential. The current through the tube 110 depends in part upon the bias on its control grid as does the current through the tube 112. The bias on the control grid of the tube 110, however, varies above and below about zero potential in accordance with the output of the two discriminator circuits. The relay coil 98 is connected between the anodes of the tubes 110 and 112 and operates as described hereinbefore to run the motor M in one direction or the other depending on the direction of drift of the mean frequency of the master oscillator.

In the single tube circuit, when the tube 60 is operating in a non-linear region, the balance point is sensitive to changes in the plate and screen supply voltage. In the two-tube embodiment the circuit is insensitive to changes in B supply, since both tubes will be affected in the same manner and by equal amounts. The bridge is balanced as described above in connection with Fig. 1, and remains balanced during the warm-up period, since the two tubes are arranged symmetrically in the bridge circuit. Since the tubes use cathode bias a change in the plate supply voltage will change the bias. This change in bias will change the plate resistance of the tubes. In the single tube circuit this changes the balance point since the resistor arm current varies with the B volts while the tube arm current changes in accordance with changes in the cathode volts times the gain of the tube. Both arms of the two-tube bridge circuit are affected in equal manner by these changes, causing negligible shift in the balance point.

The purpose of the resistor 126 connected between the plus B and the cathodes of the two-tube circuit is to raise the bias thereon and thereby allow a smaller cathode resistor to be used at 120. A smaller cathode resistor makes possible a greater gain from the tubes which in turn makes the circuit more sensitive to control voltage on the grid of the first tube. Note that this resistance shunts the direct current source as well as part of both halves of the bridge, and therefore does not destroy the balance thereof. In an embodiment which operated very well the tubes 110 and 112 were of the 6AC7 type, 114 and 116 were 47,000 ohm resistances, 118 was a 10,000 ohm potentiometer, 50 was a 56,000 ohm resistance, 126 was a 15,000 ohm resistance, the screen grids operated at +150 volts and the tap on resistance 118 was supplied with plus 250 volts D. C. 120 was a 56 ohm resistance.

What is claimed is:

In apparatus for controlling the direction of rotation of a motor in accordance with a potential which varies above and below substantially zero potential, a bridge circuit having two impedance arms each comprising two impedances in series across a source of direct voltage and also having a diagonal, one of said arms comprising two fixed impedances and the other arm comprising one fixed impedance and the output impedance of a pentode having a control grid excited by said potential, means connecting the screen grid of said pentode to a tap on an impedance in said one arm, a relay winding in the diagonal of said bridge, the impedances of the arms being such that with zero potential on said control grid the bridge is substantially balanced and no current flows through said winding, a motor having two windings and a rotor, an armature controlled by said relay winding, a source of current for said motor windings, and circuits including contacts cooperating with said armature for connecting said source of current to one of the other of the motor windings to drive said rotor in a direction depending on the value of said first-mentioned potential relative to zero potential.

JOSEPH G. BEARD.

REFERENCES CITED

The following references are of record in the file of this patent:

UNITED STATES PATENTS

| Number | Name | Date |
|---|---|---|
| 2,305,307 | Wellenstein et al. | Dec. 15, 1942 |
| 2,329,073 | Mitchell et al. | Sept. 7, 1943 |
| 2,346,437 | Krogh | Apr. 11, 1944 |